United States Patent [19]

Greenwald

[11] Patent Number: 4,630,821
[45] Date of Patent: Dec. 23, 1986

[54] VIDEO GAME APPARATUS INTEGRAL WITH AIRPLANE PASSENGER SEAT TRAY

[75] Inventor: Larry H. Greenwald, New York, N.Y.

[73] Assignee: Aero-Vision Systems, Inc., New York, N.Y.

[21] Appl. No.: 704,202

[22] Filed: Feb. 22, 1985

[51] Int. Cl.[4] ................................................ A63F 9/22
[52] U.S. Cl. ....................... 273/85 G; 273/DIG. 28; 273/148 B; 297/163; 297/191; 358/237; D14/83
[58] Field of Search ........... 273/309, 148 B, DIG. 28; 297/191, 163–169; 312/194–196; 358/237, 254, 239; D14/79–84; D6/44; 340/734

[56] References Cited

U.S. PATENT DOCUMENTS

| | | | |
|---|---|---|---|
| 4,031,542 | 6/1977 | Anderson | 358/239 |
| 4,072,346 | 2/1978 | Schueler | 297/163 |
| 4,095,791 | 6/1978 | Smith et al. | 273/85 G |
| 4,114,366 | 9/1978 | Renner et al. | 340/767 |
| 4,208,676 | 6/1980 | Berwick et al. | 358/231 |
| 4,382,254 | 5/1983 | Ranalli | 340/767 |
| 4,516,777 | 5/1985 | Nikora | 273/DIG. 28 |
| 4,518,164 | 5/1985 | Hayford | 273/148 B |
| 4,521,021 | 6/1985 | Dixon | 273/DIG. 28 |

OTHER PUBLICATIONS

Boeing Conceptual Drawing, FIG. 15, p. 864 of NASA CP-001 entitled "Proceedings of the Star Conference, Part 2", held at Langley Research Center, Hampton, Va., Nov. 9–12, 1976.

*Primary Examiner*—Richard C. Pinkham
*Assistant Examiner*—MaryAnn Stoll Lastova
*Attorney, Agent, or Firm*—Arthur L. Plevy

[57] ABSTRACT

There is disclosed a video game apparatus to be employed by a passenger of an airplane. The apparatus includes a tray which is mounted on the rear of an airplane seat. The tray has an internal hollow with a rectangular aperture on a top surface which surface faces the passenger when the tray is placed in a usable position. Located in the rectangular aperture is a TV display screen. Located in the internal hollow of the tray is a video game apparatus which operates to provide a video game display on the surface of said TV display screen. The surface of the tray containing the TV display screen also includes a plurality of control elements which are coupled to the video game apparatus to enable the passenger to operate the game. To energize the game, the tray contains a cable coupling assembly whereby when a cable is inserted into the assembly, the video game is energized to provide a display of a game selected by means of a selector switch also mounted on the top surface of the tray.

18 Claims, 6 Drawing Figures

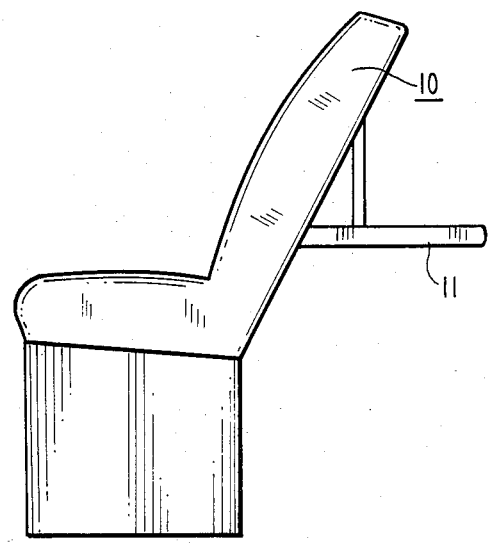
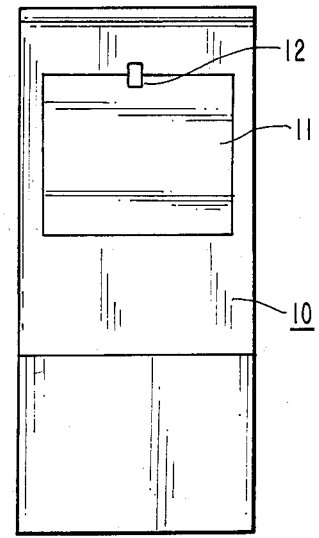
FIG. 1      FIG. 2
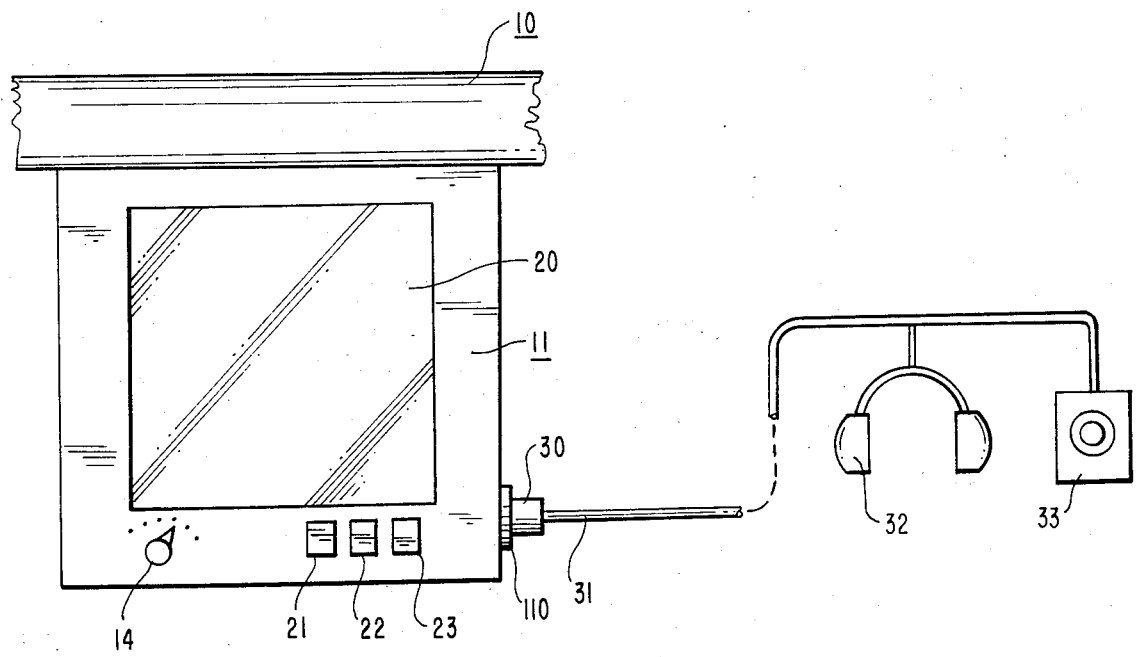
FIG. 3

VIDEO GAME APPARATUS INTEGRAL WITH AIRPLANE PASSENGER SEAT TRAY

BACKGROUND OF THE INVENTION

This invention relates to video games in general and more particularly to a video game which is constructed as an integral unit of an airplane passenger seat tray.

It is well known that long airplane flights can be extremely tedious to passengers. This factor has induced the airline industry to offer various forms of entertainment during the course of such flights such as movies or earphones to listen to various programmed material. Many of these features are accommodated on modern aircraft to make the passenger as comfortable as possible during such long flights. It is also well known that video games have achieved wide spread popularity and are enjoyed by most individuals. Such video games are extremely diverse in nature and afford a diverse source of entertainment to the consuming public.

It is, therefore, an object of the present invention to provide an improved video game which game is integrally formed as part of a passenger tray as the type found on most modern aircraft.

It is a further object to provide a video game apparatus which can be employed on an aircraft or other vehicle which can be utilized by the passenger to occupy his time during long flights.

BRIEF DESCRIPTION OF THE FIGURES

FIG. 1 is a side elevation view of an airplane passenger seat employing a tray.

FIG. 2 is a rear view of the airplane passenger seat and tray.

FIG. 3 is top plan view showing a video game apparatus incorporated in the tray according to this invention.

BRIEF DESCRIPTION OF THE PREFERRED EMBODIMENT

Figure 4:
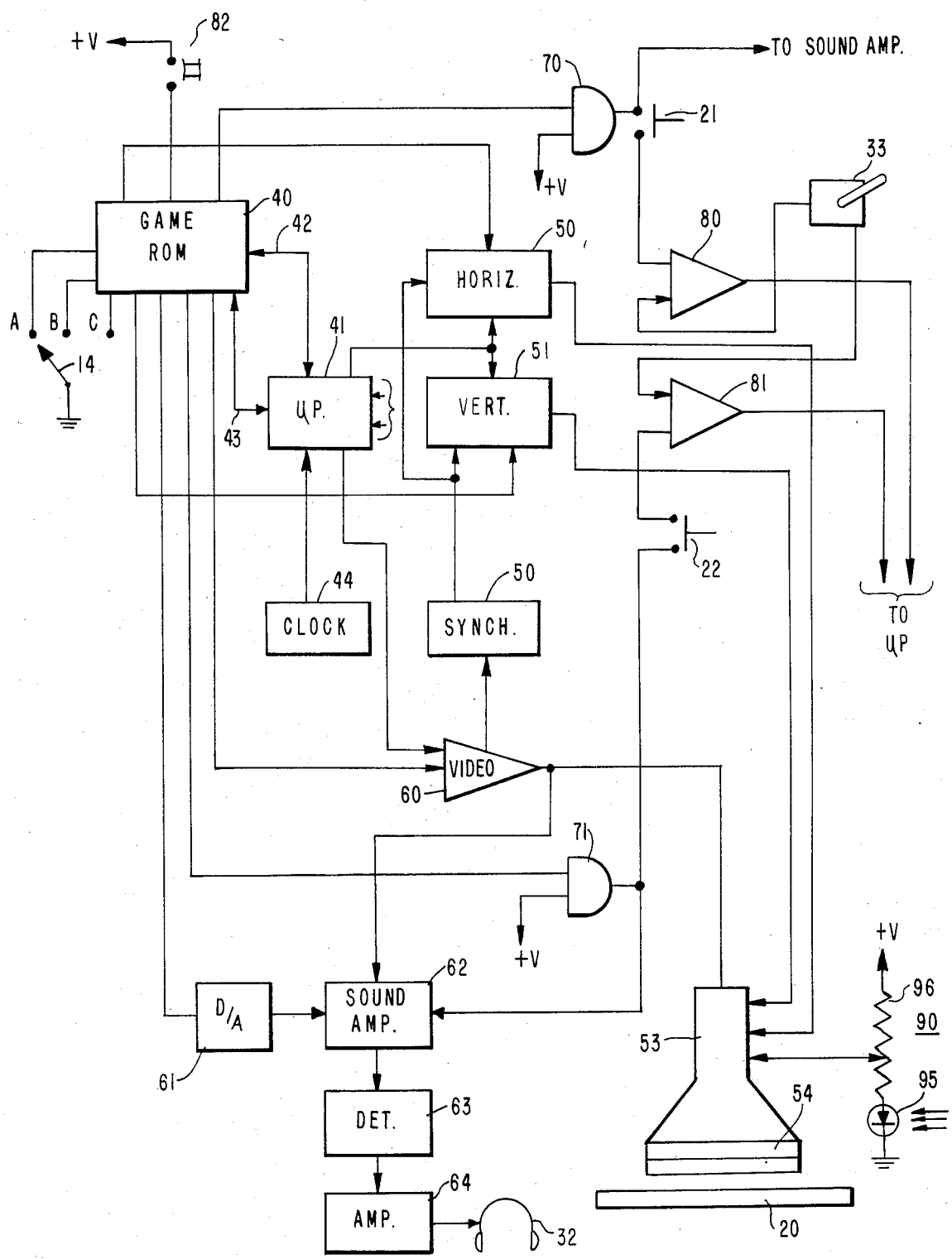
FIG. 4 is a detailed block diagram of the video game apparatus contained with the hollow of the tray.

Video game apparatus to be employed by a passenger of an airplane comprising a tray mounted on the rear of an airplane seat in front of a passenger seat, said tray having an internal hollow with a top rectangular aperture on a top surface facing said passenger, a TV display screen positioned in said top rectangular aperture of said tray, video game means located in said hollow of said tray and adapted to illuminate said TV screen when energized, a plurality of control means mounted on said top surface of said tray and coupled to said video game means for enabling said passenger to operate said game means, and cable coupling means positioned on said tray and coupled to said video game means to apply operating potential to said display when a cable is inserted into said means, a cable coupled to a head set and adapted to be inserted into said cable coupling means to apply operating potential to said video game means and to enable said passenger to receive audio information from said video game means via said headset when said cable is inserted.

DETAILED DESCRIPTION OF THE DRAWINGS

Referring to FIG. 1, there is shown a typical passenger seat 10 as those normally employed on various aircraft. As is well known, the passenger seat 10 is associated with a tray 11 which can be raised or lowered by the occupant of an airplane seat and is normally used to accommodate a tray or glasses and so on for passengers. The tray 11 is positioned on the rear of the seat 10 so that the occupant of the seat behind seat 10 will have access to his associated tray.

For examples of such trays, reference is made to U.S. Pat. No. 3,762,766 entitled AIRPLANE SEAT ASSEMBLY which issued on Oct. 2, 1973 to C. J. Barecki, et al. As will be explained, the passenger tray 11 is normally secured to the back of the seat by means of a suitable latch as 12 although various other embodiments of such trays are available on different aircraft. All such trays constitute a flat planar surface which is usually rectangular or square in configuration and has a large enough surface area to conveniently accommodate the typical tray as utilized on such aircraft.

Referring to FIG. 3, there is shown a top view of a video game which is incorporated and integraly formed with a tray and which apparatus is the subject of this invention. In FIG. 3, a portion of the rear of the seat 10 is shown. The video game apparatus constitutes a flat planar panel 20 which panel is mounted within the tray compartment 11 as shown in FIGS. 1 and 2. Essentially, the flat planar panel 20 is fabricated from an opaque plastic which plastic may have imbedded therein small metallic particles to prevent RF radiation form affecting the aircraft communications system during display operation. The panel 20, as will be explained, is utilized as a projection screen to enable a video display to be projected from the internal hollow of the tray housing 11 and to be displayed to the passenger when playing a selected video game.

As is seen in FIG. 3, the display panel 20 is associated with a series of switches as 21 to 22. These switches, as will be explained, enable the passenger to manipulate the game characters or, for example, to simulate the firing of a gun or other devices which are widely employed in video games. The housing 11 also contains a selector switch 14 which is utilized by the passenger to select one of a number of games in which he wishes to participate. As will be explained, different game formats are contained in a read-only memory which is located within housing 11 and which memory may be replaced by airline personnel at suitable intervals. This thereby gives the airlines the capability of changing the game formats to provide further amusement and diversification for the passenger.

Also shown coupled to the housing 11 is an input jack 30. The jack 30 is associated with a cable 31 which cable is connected to a pair of headphones 32 and to a joy stick controller 33. Before proceeding with a detailed explanation of the system operation, the use of the system is as follows.

A passenger who wishes to participate in playing a video game would purchase the jack and cable unit 30 which is associated with the headphones from the flight attendent by paying a nominal fee. Upon insertion of the jack 30 into a female receptacle located on the side of panel 11, the video game apparatus contained within the hollow of the housing 11 is activated. In this manner power is supplied to the circuitry contained within the hollow housing 11 and coupling is made to the headphones 32 and to the joy stick controller 33. A display of the video game selected by the passenger via switch 14 is presented upon display panel 20. The earphones will transmit the various sounds associated with the game to the passenger while the joy stick 33 is employed by the passenger to manipulate a game character over the face of the display screen 20 as is done and accommodated in present video games As one can ascertain, if a passenger does not want to participate in video game playing then the surface 20 of the passenger tray 11 functions as a normal supporting surface and can be used in the conventional manner as such prior art trays. As will be explained, the apparatus provided and as shown in FIG. 3 will enable a passenger by the payment of a suitable sum to participate and play various video games according to his preference during the course of an aircraft flight. It is understood that the concept can be applied to any transporation vehicle which employs similar trays such as passenger trains, buses and so on.

Referring to FIG. 4, there is shown a detailed block diagram of the circuitry which is included in the hollow of the tray housing 11. In certain instances the same reference numerals have been employed for clarification. As shown in FIG. 4, there is a read-only memory or game ROM 40. Such memories are well known and are widely available and understood. Essentially, the ROM 40 has pre-programmed therein a plurality of different game formats which are permanently stored in the ROM 40. The ROM 40, as will be further explained, is under the control of a microprocessor 41 which essentially controls the opertion of the entire system. The use of microprocessors as 41 in video game formats is widely known and a suitable example of a microprocesser which can be employed in the above structure is the MC6800 microprocessor available from Motorola Semiconductor Products, Inc.

It is understood that there are many other types of microprocessors which can be employed as well. The microprocessor 41 communicates with the ROM 40 via bi-directional data buses 42 and 43. The timing operation for the microprocessor 41 and the ROM 40 is afforded by means of a clock 44. The clock circuit 44 may comprise a plurality of binary multivibrators which operate to provide various clock signals from a crystal oscillator contained in the clock circuit 44. Such timing circuits are well known in the state of the art as well as the utilization of such circuits to control microprocessor operation.

There is shown a horizontal circuit 50 and a vertical circuit 51. The horizontal and vertical circuits are typically those horizontal and vertical circuits which are found in a conventional television receiver and are necessary to provide the required raster for the generation of television pictures. The microprocessor 41, as will be explained, controls the synchronization of the horizontal and vertical circuits 50 and 51. The horizontal and vertical circuits 50 and 51 are coupled to the appropriate drive coils of a CRT 53. The CRT 53 is a mini cathode ray tube which provides a display of one inch by one inch. Such miniature CRT's are well known in the art and are, for example, available from many manufacturers such as the Sony Corporation and other manufacturers as well.

The CRT 53 is extremely small and compact and hence as will be explained, the required width of the housing 11 is approximately two inches in width mainly to accommodate the CRT 53. Both the horizontal and vertical circuitry can also be coupled to the game ROM 40 depending upon the type of game played and to afford changes in the display according to data stored in the RCM 40. One output of the ROM is coupled to an input of a video amplifier having its output coupled to the grid or cathode of the CRT 53 for modulating the beam during the scanning of the raster in a conventional manner. Another input to the video amplifier is obtained from the microprocessor 41. Essentially, the microprocessor 41 and the ROM 40 operate as a unit to provide the necessary storage for generating a video game display. The microprocessor essentially controls the ROM as will be further explained.

The dual input to the video amplifier 60 enables operation of the video amplier from information contained in the ROM 40 or from information generated by the microprocessor 41 which essentially can operate to generate a video type signal which signal may contain the necessary synchronizing components for the horizontal and vertical oscillators contained in the horizontal and vertical circuits 50 and 51. Hence shown coupled to the video amplifier is a sync separater circuit 60. The ROM 40 has a further output coupled to a digital to analog converter 61 for converting digital signals stored in the ROM to analog signals which analog signals may be amplified by a sound amplifier 62. In a similar manner, the video amplifier 60 may supply the sound amplifier 62 with a modulated signal containing the sound subcarrier associated with a TV signal which subcarrier is then detected via detector 63 and coupled to an audio amplifier 64 for energizing the headset 32.

Also shown in FIG. 4 are AND gates 70 and 71. Each AND gate receives an input from the ROM and has a second input coupled to a source of bias potential designated as +V. The outputs from the AND gates are coupled via a switch as switches 21 and 22 located on the panel 11 as shown in FIG. 3. The switches 21 and 22 are momentary operated switches and as one can see from FIG. 4, when the switches are operated, the output of the respective AND gate as gates 70 and 71 are respectively applied to the inputs of amplifiers 80 and 81. The other inputs of the amplifiers are directed to the output terminals of the joy stick controller 33 with the outputs of amplifiers 80 and 81 directed to real time inputs of the microprocessor.

Also shown in FIG. 4 is the selector switch 14 which is associated with three terminals designated as A, B and C with the terminals coupled to the game ROM 40 to enable the user to select a game format according to placing the selector switch in positions A, B or C. In this manner, the game ROM has three memory storage sections for storing therein information relating to three or more different types of games which the passenger can select via the switch 14. The output of the miniature CRT 53 is coupled through a lens assembly 54 where the image is magnified and projected on the rear of the opaque panel 20 to enable the passenger to thereby view the one inch by one inch image in a magnified state as afforded by the lens system 54. Such lenses are well known and essentially have been employed in the prior art for providing magnification of a video picture.

As one can ascertain, the lens system 54 is relatively inexpensive and esentially may consist of the type of lens which was employed many years ago to obtain increased magnification for viewing a small picture tube. The magnified image is thus directed upon the surface of the planar plastic memory 20 so that the passenger can view the picture.

Also shown connected to the CRT 53 is a brightness limiter circuit 90. Essenitally, the circuit 90 contains a photodiode 95 which is coupled to a resistive divider 96. The photo diode 95 varies its resistance according to the light intensity of the environment. The photo diode 95 may be exposed to light via a window such as window 23 located on the tray panel 11. In this manner, the brightness of the display will vary according to the ambient light in the aircraft. For example, for a great deal of light, the display will be less bright and for less light the display will be more bright. The limiter is adjusted to prevent undue brightness from interfering with the comfort of other passengers during a night flight.

Brightness limiting circuits or brightness control circuits for CRTs are also well known in the field. An example of typical operation of the circuit of FIG. 4 will now be given to gain a clearer understanding of how the individual modules operate in conjunction with one another. As indicated, the entire display is activated when the passenger purchases the jack and cable 30 and associated components from the flight attendant. Upon insertion of the jack 30 into the female receptacle located on the side of the housing 11, power is applied to the apparatus. This is shown essentially by switch 82 which will be activated for applying a source of bias as +V to the ROM, the microprocessor and the various other circuits shown in FIG. 4. When the display is activated, the panel 20 will be illuminated as a video raster will be generated. The passenger then accesses selector switch 14 to select a game of his choice. This selects a section of ROM memory which has stored therein the various parameters necessary to implement the game.

The position of switch 14 is also relayed by the ROM 40 to the microprocessor 41. Essentially, the microprocessor 41 has stored in its data memory the necessary programs to implement the game pattern as selected by the passenger by means of switch 14. The microprocessor has a line counting program included therein. Such programs are well known and essentially the microprccessor keeps track of each television line. As one can understand, in the NTSE system, there are 525 lines generated to produce a complete picture. The microprocessor has a television line counter program which will essentially count each line so that the microprocessor knowns exactly at what line the display is located. The microprocessor 41 then produces address locations for addressing the game ROM 40 according to the game program stored in the microprocessor. In this manner, the microprocessor will cause the ROM to produce at its output the information stored in the microprocessor at various address locations which information is pertinent to the game in being played. The horizontal and vertical oscillators which are contained in the horizontal and vertical drive circuits 50 and 51 are essentially free running devices which are synchronized by the microprocessor in a relatively conventional manner. Thus the microprocessor, by addressing the ROM, utilizes the data stored in the ROM to provide a video signal according to such data which signal is applied to the video amplifier 60. The microprocessor essentially contains a program which will convert the digital information stored in the ROM to pulse width digital information which is used directly to modulate the CRT. It is, of course, understood that one can convert the digital information by means of a digital to analog converter prior to applying it to the video amplifier 60. The microprocessor can also instruct the ROM 40 to apply stored information at various locations directly to the video amplifier. In this manner, the stored information may consist of repetitive digital patterns which will function to modulate the beam as it is being scanned during a raster.

The ROM 40 also supplies inputs to gates 70 and 71 which inputs are applied to the gates according to the instructions from the microprocessor 41. In this manner during raster generation, gates 70 and 71 are selectively activated by the ROM 40. This selective activation is accomplished by the microprocessor instructing the ROM to activate the inputs of gates 70 and 71. During this time, if the passenger operates switches 21 and 22, the amplifiers 80 and 81 provide an indication that the switches have been operated which outputs are fed back to the microprocessor. If the user operated the switches during the correct time interval then the microprocessor will generate a signal showing the passenger that the accomplished results have been obtained, such as the shooting down of a target or the proper movement of a character and so on.

The microprocessor also instructs the ROM to release digital information during the course of the display indicative of audio which is converted by the digital to analog converter 61 and then transferred to the headset 32 by means of amplifier 64. In this manner, the user receives sound indicative of the action achieved on the display screen during video game operation. Essentially, as described above, a main function of the microprocessor is to act as a character generator whereby the microprocessor by keeping track of the television line count can provide digital signals to the video amplifier which are essentially converted to analog type of information by the CRT.

This technique is known in the art but is implemented herein to substantially reduce the component cost. As one can ascertain, in normal video game apparatus separate circuitry is necessary to implement the video game which circuitry is eventually coupled to the antenna terminals of a full television receiver. Due to the fact that this apparatus is a dedicated video game, one can eliminate much of the circuitry found in prior art video games. The techniques of programming the microprocessor for the above described control are well known as well as the techniques for providing video game patterns utilizing microprocessors and associated memories. See for example a text entitled MICROPROCESSOR APPLICATIONS MANUAL published by McGraw Hill Book Company, 1975 and edited by the staff of Motorola Semiconductor Products, Inc.

It is understood that based on the above noted operation that the microprocessor and the ROM operate to share memory storage while the microprccessor essentially operates as a character generator while addressing the ROM at suitable intervals to obtain additional data necessary for complete display operation. As indicated during certain game formats, the microprocessor will generate a signal which contains necessary synchronizing information for applying that signal to the video amplifier 60 whereby the digital sync detector 50 will respond to such information to further modulate or control both the vertical and horizontal circuits to thereby produce additional effects necessary for other game formats.

Figure 5:
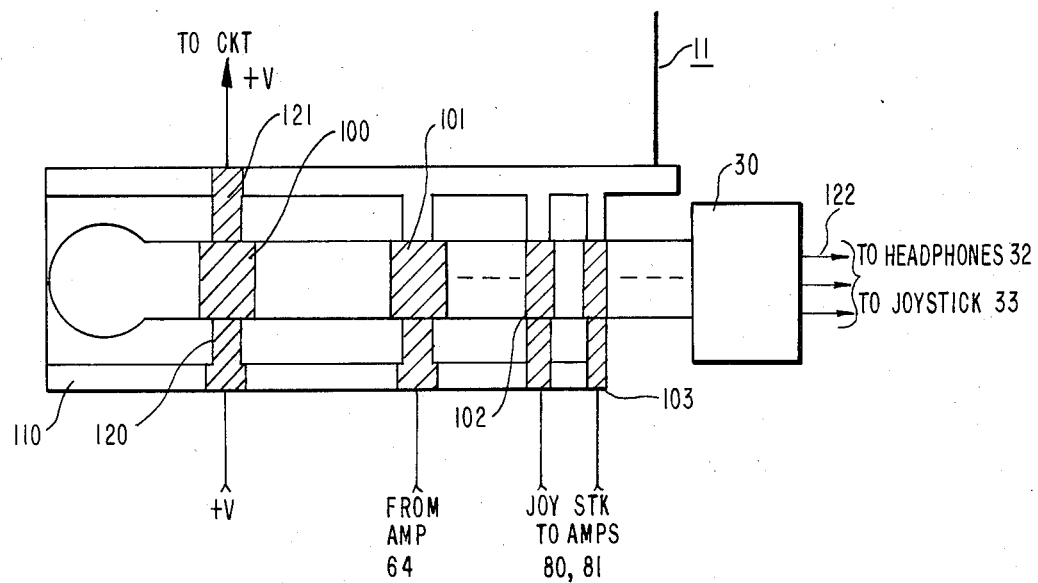
FIG. 5 is a partial cross sectional view showing input cable coupling receptacles.

Referring to FIG. 5, there is shown an example of the jack 30 of FIG. 1. The jack 30 is a telephone type jack which contains conductive areas as 100, 101, 102 and 103. These conductive areas associated with the jack 30 align with corresponding conducting areas such as 120 which are associated with a female receptacle 110 located on the side of the panel 11. In this manner, as seen in FIG. 5, when the jack 30 is inserted to receptacle 110 a bias voltage is applied via contact 120 through the conductive ring 100 to contact 121. This bias power is the source of potential +V necessary to provide operating potential for the video display. In a similar manner, the conductive ring 101 couples the output of amplifier 64 to cable 122 associated with the headphones 32 while the conducting rings 102 and 103 couple the joy stick control 33 to the inputs of amplifiers 80 and 81.

As one knows, a joy stick control is essentially a potentiometer which will provide a variable resistance for horizontal and vertical motion.

When certain video games are played, they may necessitate use of the joy stick 33. The outputs from the joy stick are applied to the amplifiers 80 and 81. The amplifiers produce corresponding outputs relative to the vertical and horizontal movement of the joy stick which outputs are converted by the microprocessor into suitable signals to thereby affect the raster or the movement of an object on the raster according to the manipulation of the joy stick 33 by the passenger.

Figure 6:
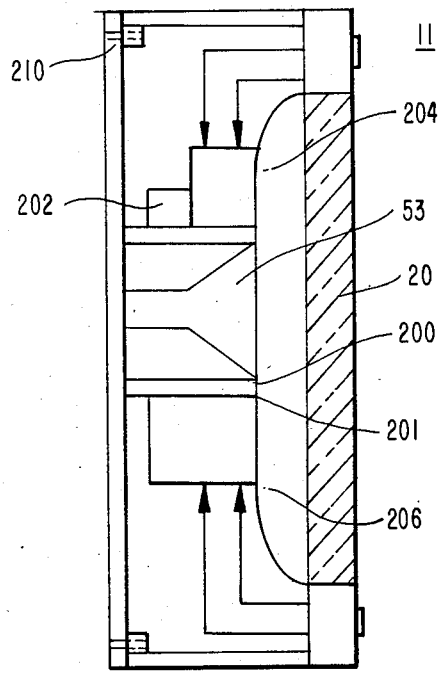
FIG. 6 is a partial sectional view showing the components as located within the internal hollow of the tray housing.

Referring to FIG. 6, there is shown a cross sectional view of the housing 11 indicating the modular nature of the circuitry of FIG. 4 as described above. Essentially, the plastic panel 20 is shown in cross section with the CRT 53 contained within an enclosure 200 and having its face plate or viewing screen aligned with a magnifying lens system 201. The ROM module which is an integrated circuit is shown as module 202 and plugs directly into a microprocessor and control board 204 which is coupled to module 206 via a connecter. The module 206 contains remaining electronics all of which exist in integrated circuit form. Hence as one can see from FIG. 6, the main volume occupied by the internal hollow of the tray housing 11 constitutes the CRT 53 and the magnifiying optics 201. The back panel 210 of the housing 11 is removable to enable repair of the unit or to further enable the replacement the ROM assemblies 202 in order to change the game format. It will be understood from the above description that there are many alternative embodiments available. As for example, one can employ an actual flat screen video display in lieu of the projection system described above. Such flat screen displays are known in the art. See for example, U.S. Pat. No. 3,748,378 entitled FLAT PANEL VIDEO DISPLAY DEVICE which issued on July 24, 1973 to A. D. Garrison. It would be apparent that by utilizing a flat screen display, one can implement a video game apparatus in a completely conventional manner as those video games which exist in the prior art.

It is, therefore, understood that a major advantage of this invention is the incorporation of the game apparatus within the tray associated with an airplane passenger seat to thereby enable the passenger to be entertained and occupied during long flights. The above described techniques and programs for the microprocessor as controlling the ROM are also known in the art in that many existing video games utilize a microprocessor and associated ROMS for same operation.

The various associated circuitry such as the gates 70 and 71 operating switches 21 and 22 are believed to be completely unique based on the format and structure of FIG. 4. However, it is again apparent that many alternations and modifications can be made by one skilled in the art when reviewing the above noted specification and all such modifications are deemed to be encompassed within the breadth and the scope of the claims appended hereto.

I claim:

1. Video game apparatus to be employed by a passenger of an airplane comprising:

a tray mounted on the rear of an airplane seat in front of a passenger seat, said tray having an integral hollow with a top rectangular aperture on a top surface facing said passenger;

a TV display screen positioned in said top rectangular aperture of said tray, said TV display screen having a viewing area no larger than 3"×3" and a depth readily accommodated by said tray;

video game means located in said hollow of said tray and adapted to illuminate said TV screen when energized;

a plurality of control menas mounted on said top surface of said tray and coupled to said video game means for enabling said passenger to operate said game means;

cable coupling means positioned on said tray coupled to said video game means to actuate said video game means and said display for play by a passenger when a cable is inserted into said means;

a cable coupled to a head set and adapted to be inserted into said cable coupling means to actuate said video game means for play and to enable said passenger to receive audio information from said video game means via said headset when said cable is inserted;

brightness limiter means interconnected to said TV display menas, said brightness limiter means including means for sensing ambient light conditions and adjusting brightness exhibited by said TV display screen in response thereto;

panel means fitted in said top rectangular aperture of said tray overlying said TV display screen, said panel means occupying a substantial portion of the top surface of said tray; and a lens assembly in optical communication with said TV display screen, said lens assembly enlarging information displayed on said TV display screen to a size facilitating play of said plurality of video games by passengers and projecting said enlarged information on said panel means.

2. The apparatus according to claim 1 further including a selector switch mounted on said tray and coupled to said video game means to enable said passenger to select any one of a plurality of different video games associated with said video games means.

3. The apparatus according to claim 1 wherein said cable is further coupled to a joystick control for enabling said passenger to manipulate said video game means when said cable is inserted into said cable energizing means.

4. The apparatus according to claim 1 wherein said panel means takes the form of an opaque plastic planar member overlying said TV display screen and said lens assembly is for displaying a projected TV image.

5. The apparatus according to claim 4 wherein said video game means includes memory means having stored therein information indicative of a plurality of video games with said memory means coupled to said selector switch for selecting any one of said plurality of video games as stored in said memory, a microprocessor coupled to said memory means and operative to selectively control said stored information according to the video game selected.

6. The apapratus according to claim 5 wherein said TV display is a cathode ray tube and further including vertical and horizontal generating circuitry coupled to said cathode ray tube for providing vertical and horizontal drive signals to provide a raster, with said generating circuitry coupled to said microprocessor for synchronizing said generating circuitry according to control commands from said microprocessor.

7. The apparatus according to claim 6 wherein said memory means is a read-only memory.

8. The apparatus according to claim 7 wherein said video game means further includes logic means having one input coupled to said control means mounted on said top surface of said tray and another input coupled to said memory means, with an output coupled to said microprocessor, to enable said passenger to operate said control means according to stored information in said memory means for instructing said microprocessor of said passenger operation as affecting said video display of said selected game.

9. The apparatus according to claim 8 wherein said video game means further includes, audio generating means having an input coupled to said memory means to provide at an output an audio signal according to said selected game, with said output coupled to said cable coupling means to apply said audio signal to said headset via said cable.

10. The apparatus according to claim 9 wherein said cable coupling means comprises a female receptacle mounted on a side surface of said tray and adapted to receive a male receptacle.

11. The apparatus according to claim 10 wherein said cable is terminated in a male receptacle for insertion into said female receptacle on said tray.

12. The apparatus according to claim 11, wherein said female receptacle has a first contact coupled to a source of potential and a second contact coupled to said video game means for applying operating potential thereto when said male receptacle is inserted into said female receptacle causing contact to be made between said first and second contacts.

13. Video game apparatus to be employed by a passenger of an airplane comprising:

a tray mounted on the rear of an airplane seat in front of a passenger seat, said tray having an internal hollow with a top rectangular aperture on a top surface facing said passenger;

a TV display screen positioned in said top rectangular aperture of said tray, said TV display screen having a viewing area no larger than 3"×3" and a depth readily accommodated by said tray;

video game means located in said hollow of said tray and adapted to illuminate said TV screen when energized;

a plurality of control means mounted on said top surface of said tray and coupled to said video game means;

memory means containing data for a plurality of video games present in said video game means, said plurality of control means including at least one control means for selecting differing ones of said plurality of said video games present in said memory means and causing data therefor to be applied from said memory means to said video game means;

an optical panel occupying a substantial portion of the top surface of said tray overlying said TV display screen; and a lens assembly in optical communication with said TV display screen, said lens assembly enlarging information displayed on said TV display screen to a size facilitating play of said plurality of video games by passengers and projecting enlarged information representing that on said TV display screen on said optical panel.

14. Video game apparatus to be employed by a passenger of an airplane comprising:

a tray mounted on the rear of an airplane seat in front of a passenger seat, said tray having an internal hollow with a top rectangular aperture on a top surface facing said passenger;

a TV display screen positioned in said top rectangular apertue of said tray said TV display screen having a viewing area no larger than 3"×3" and a depth readily accommodated by said tray;

a panel overlying said TV display screen forming a top tray surface;

lens means intermediate said TV display screen and said panel, said lens means enlarging information set forth on said TV display screen to a size facilitating play of video games by a passenger and projecting said enlarged information on a rear surface of said panel;

video game means located in said hollow of said tray and adapted to illuminate said TV screen when energized;

a plurality of control means mounted on said top surface of said tray and coupled to said video game means for enabling said passenger to operate said game means;

cable coupling means positioned on said tray and coupled to said video game means to apply operating potential to said display when a cable is inserted into said means; and a cable coupled to a head set and adapted to be inserted into said cable coupling means to apply operating potential to said video game means and to enable said passenger to receive audio information from said video game means via said headset when said cable is inserted, said cable coupling means and said cable each having spatially cooperating contacting means present thereon, said spatially cooperating contacting means acting when said cable is inserted into said cable coupling means to apply operating potential to said video game means to permit a passenger to operate said game and to cause audio information generated by said video game means to be applied to said head set.

15. The apparatus according to claim 14 wherein said audio generating means further includes a digital to analog onvertor having an input coupled to said memory means for providing at an output an analog signal according to stored digital input information from said memory means, and amplifying means having an input coupled to said output of said digital to analog convertor for providing at an output an amplified version of said analog signal.

16. The apparatus according to claim 15 wherein said tray has a removable cover secured to a surface opposite the surface containing said TV display screen to enable access to said internal hollow.

17. The apparatus according to claim 16 wherein said memory means is fixedly mounted in said hollow of said tray to enable said memory means to be removed and replaced to thereby provide the storage of a different plurality of video game information.

18. The apparatus according to claim 17 wherein said plurality of control means comprises a plurality of momentary operated switches mounted on said surface of said tray.

* * * * *